United States Patent

[11] 3,547,363

| [72] | Inventors | John P. Baglino<br>Scranton;<br>Joseph R. Rappenglueck, Dalton, Pa. |
|---|---|---|
| [21] | Appl. No. | 690,628 |
| [22] | Filed | Dec. 14, 1967 |
| [45] | Patented | Dec. 15, 1970 |
| [73] | Assignee | U.S. Textile Machine Company<br>Scranton, Pa.<br>a corporation of Pennsylvania |

[54] TRAVERSE MECHANISM
5 Claims, 15 Drawing Figs.

[52] U.S. Cl. ........................................... 242/26.3,
57/99, 74/24
[51] Int. Cl. ........................................... B65h 54/28
[50] Field of Search ........................................... 242/26.1,
26.2, 26.3, 26.4, 26.41; 57/99; 74/24

[56] References Cited
UNITED STATES PATENTS

| 2,764,363 | 9/1956 | Stammwitz ................. | 242/26.2 |
| 3,097,475 | 7/1963 | Hooper et al. ............. | 242/26.2X |
| 3,243,142 | 3/1966 | Chastang ..................... | 242/26.2X |
| 3,367,588 | 2/1968 | Wolf ........................... | 242/26.3 |
| 3,370,799 | 2/1968 | Rogers ........................ | 242/26.3 |
| 2,575,031 | 11/1951 | Smith .......................... | 242/26.1 |

FOREIGN PATENTS

| 310,784 | 1/1956 | Switzerland ................. | 242/26.3 |

OTHER REFERENCES

Auslageschrift: 1,047,086, Dec. 12, 1958, Germany, Hunger et al. 242/26.1

Auslageschrift: 1,051,176, February 1959, Germany, Booske 57/99

Primary Examiner—Stanley N. Gilreath
Assistant Examiner—Werner H. Schroeder
Attorney—Nolte and Nolte ABSTRACT: In a machine for winding a continuous strand onto a core in which a means guiding the strand onto the core is caused to traverse at least part of the length of the core whereby windings of the strand are laid across the aforementioned at least part of the length of the core, there is provided a traverse mechanism for effecting said traversing. The traverse mechanism includes a lead screw engaging a running nut, means for rotationally driving the screw, means for preventing the nut from rotating with the screw, whereby rotation of the screw drives the nut in a linear path axially along the screw, and means nonpivotally linking the nut to the guide means for causing the guide means to be driven in the path of the traversing by the motion of the nut.

PATENTED DEC 15 1970

INVENTORS
JOHN P. BAGLINO
JOSEPH R. RAPPENGLUECK
BY
Nolte & Nolte
ATTORNEYS

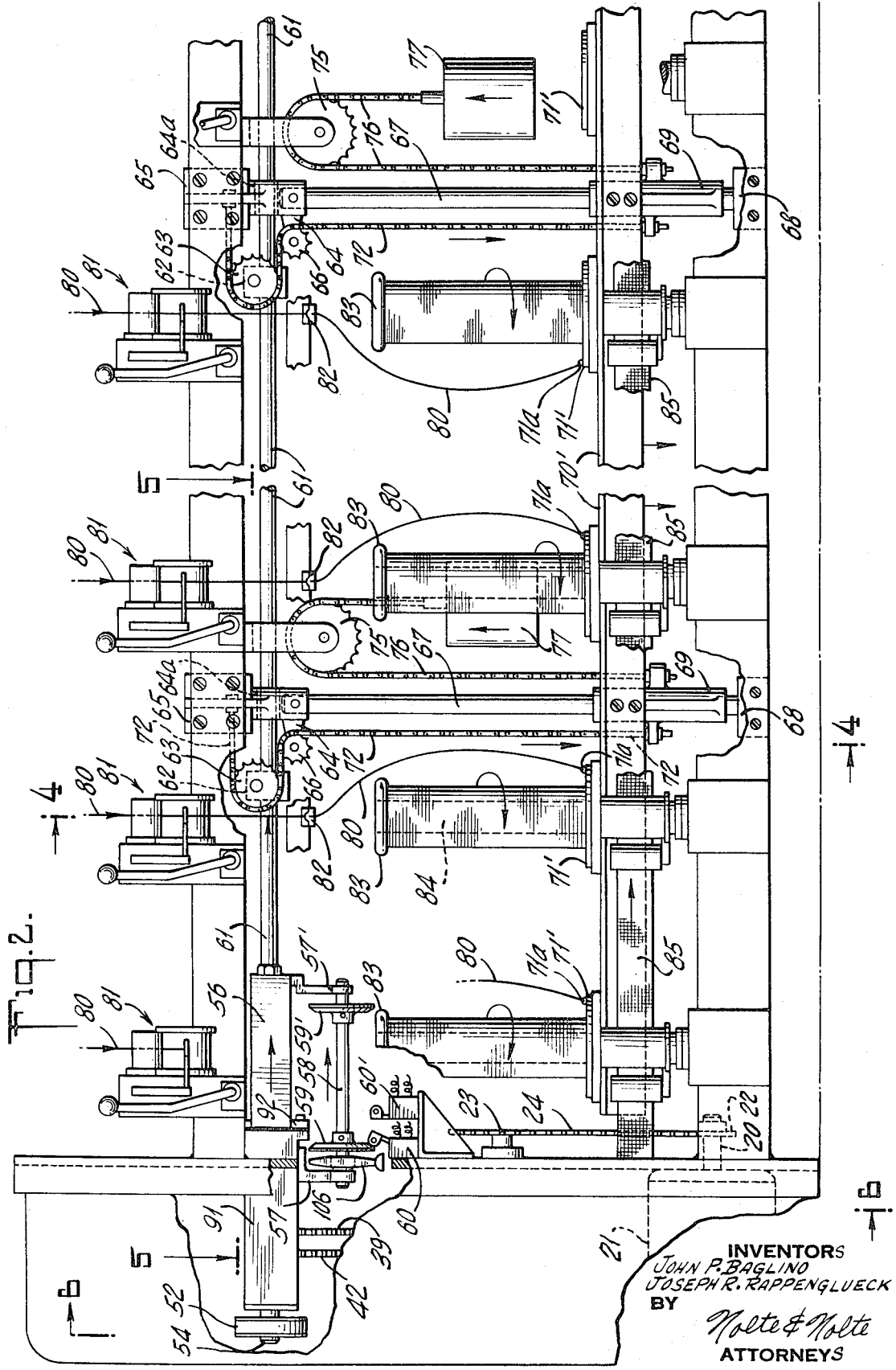

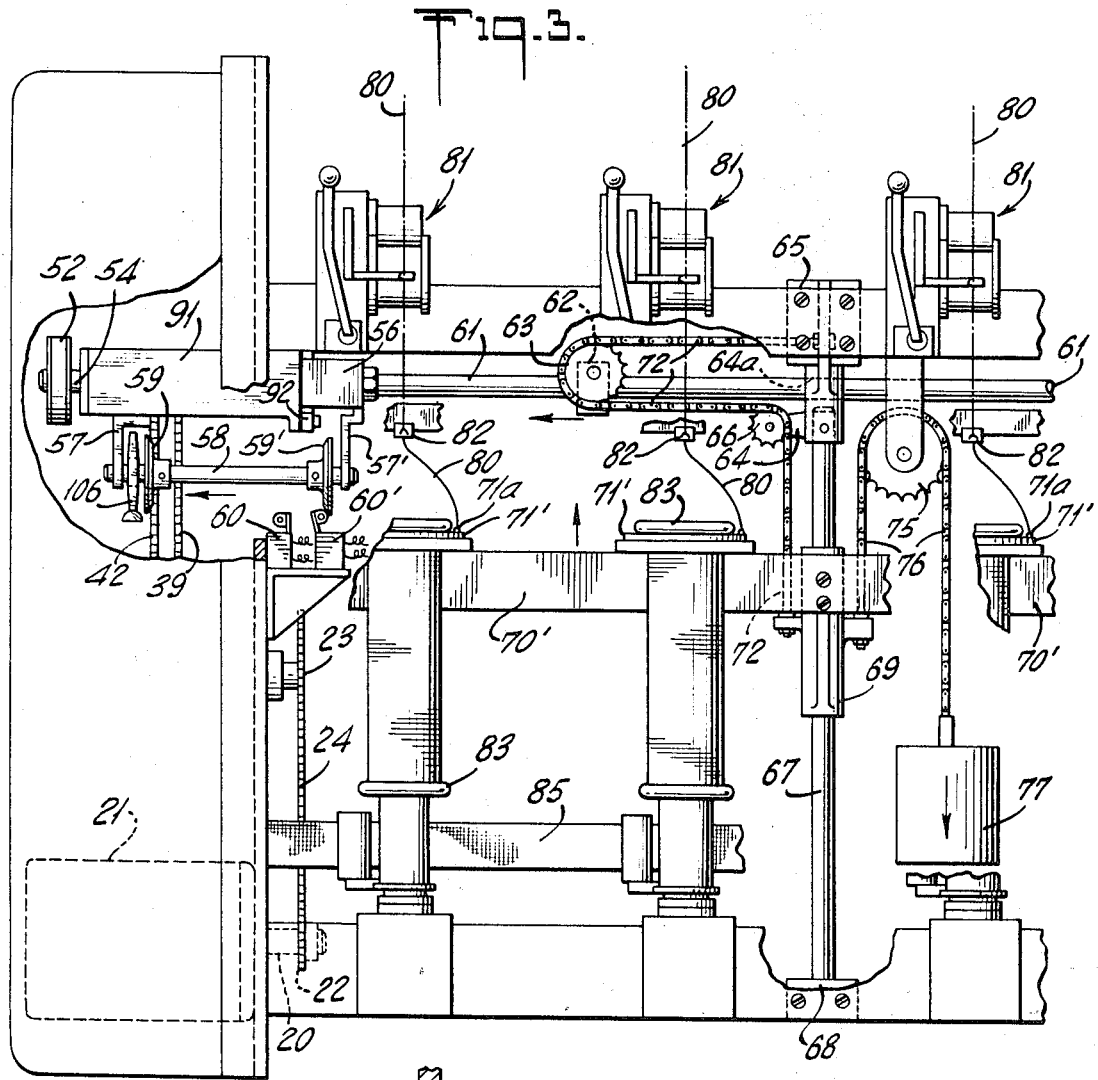

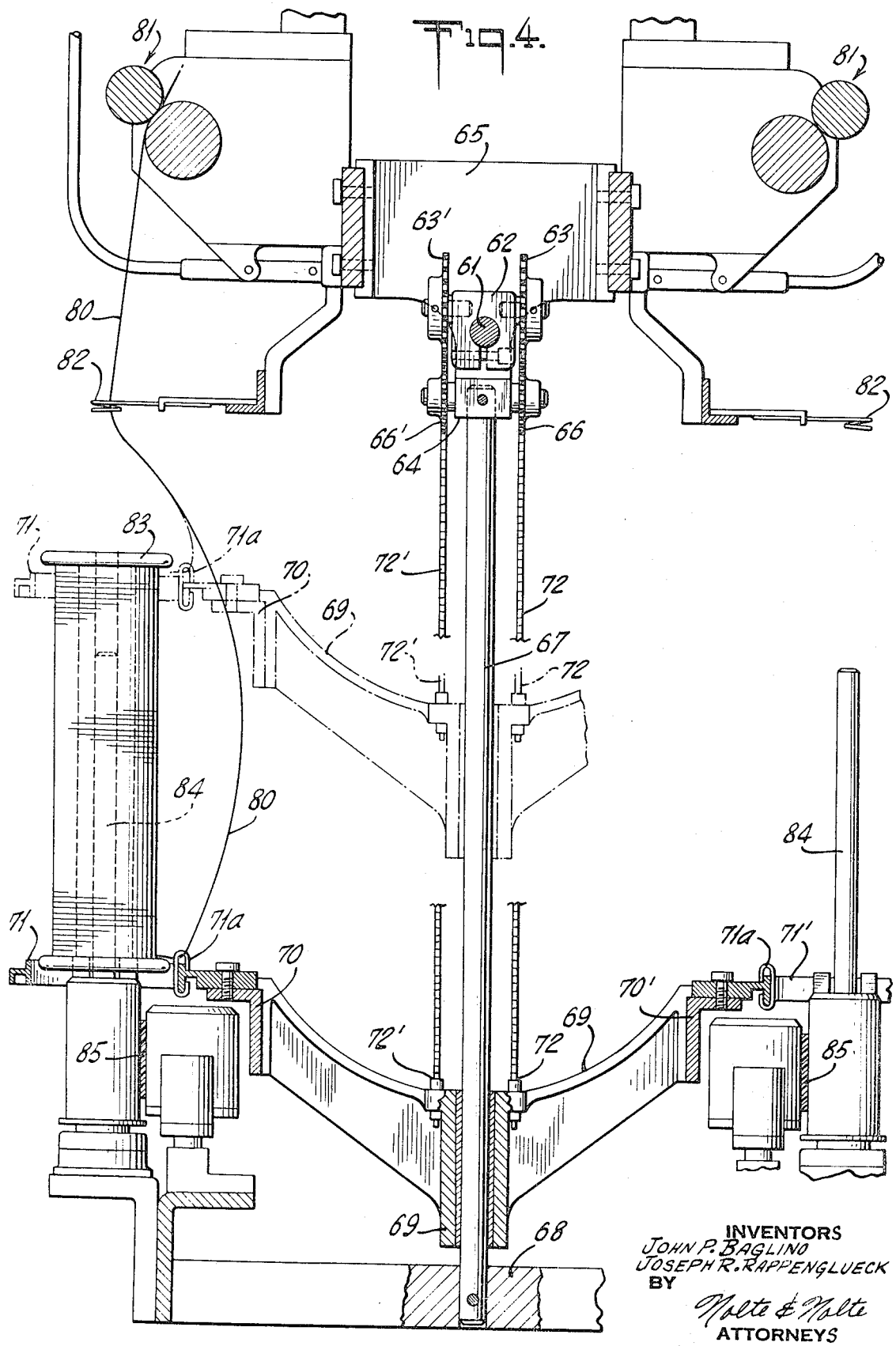

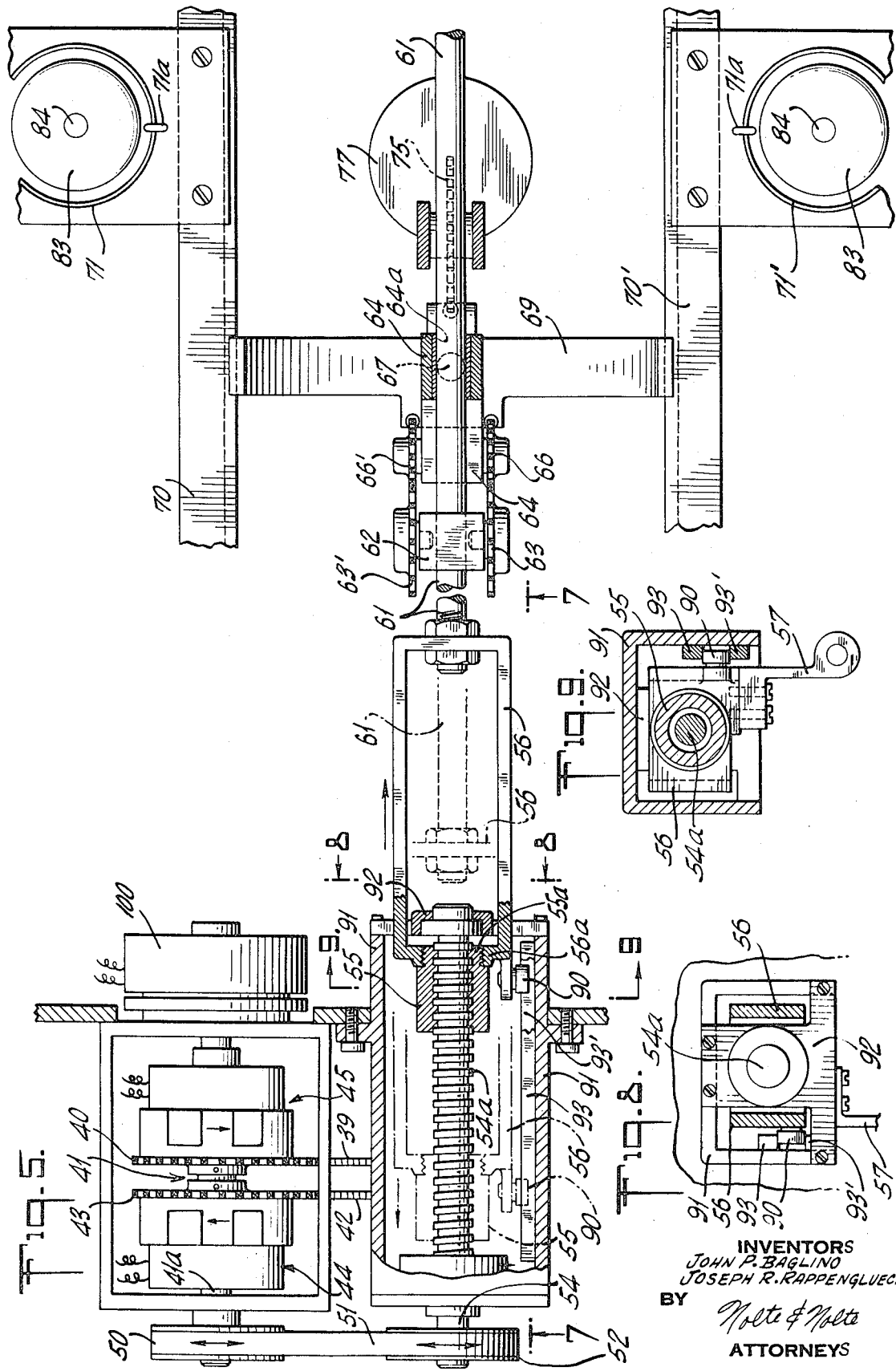

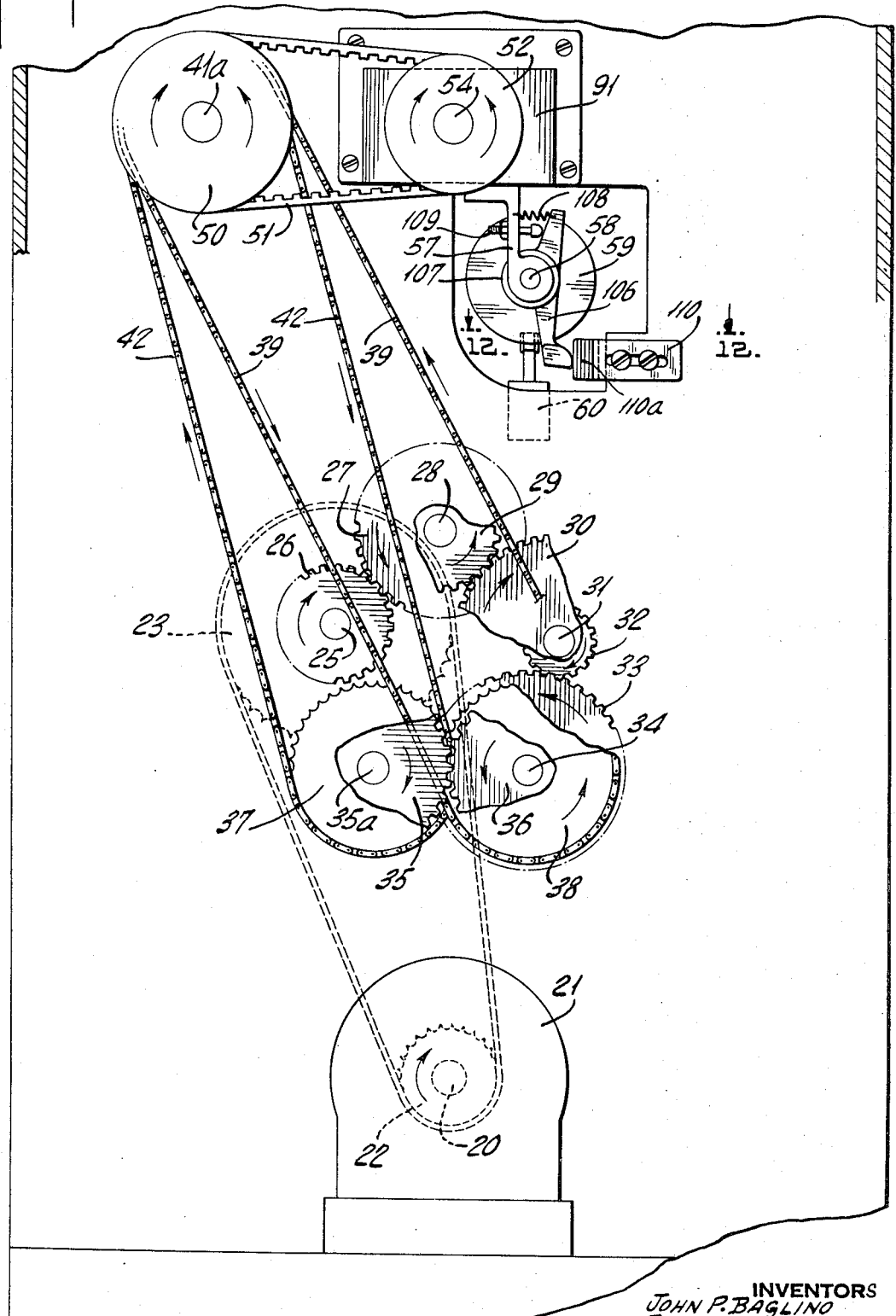

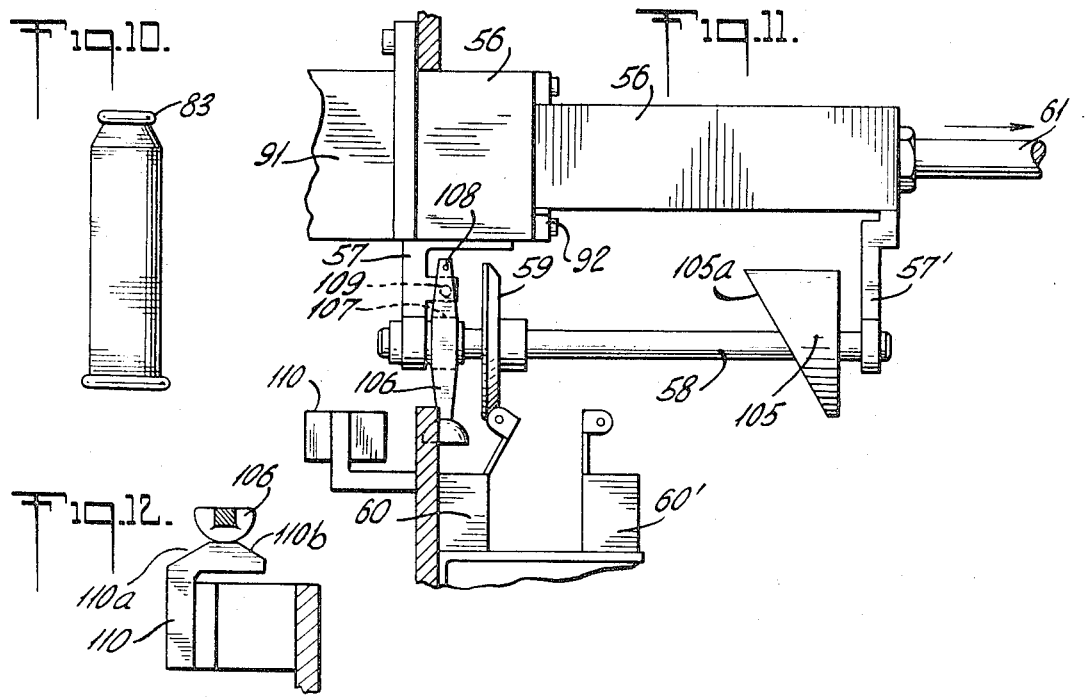
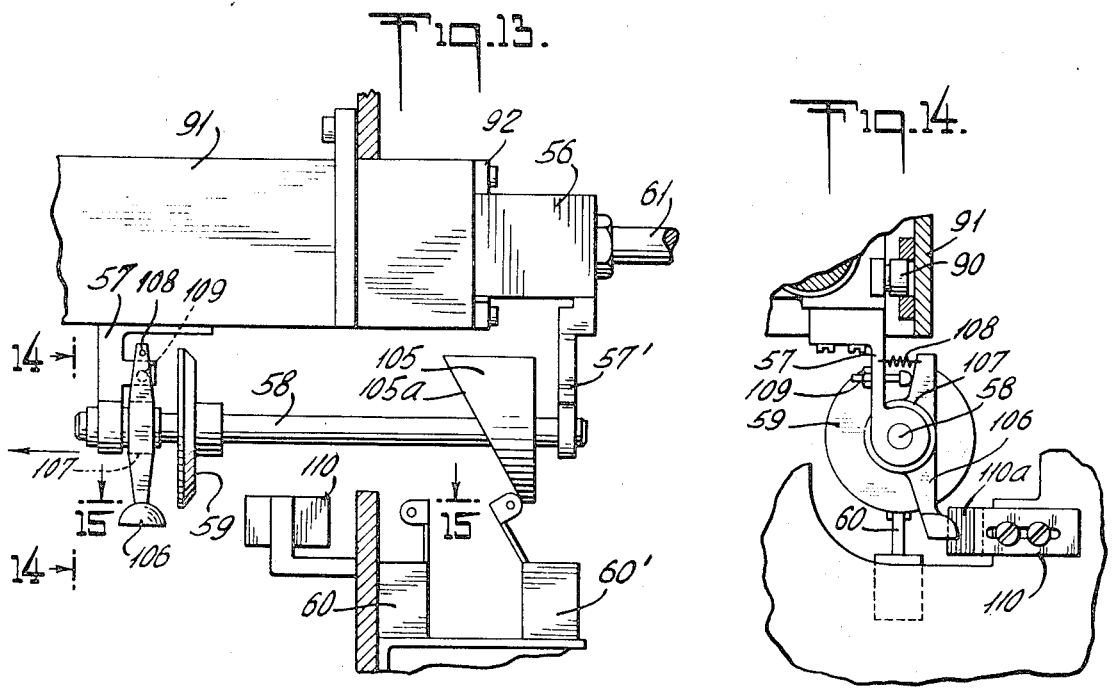
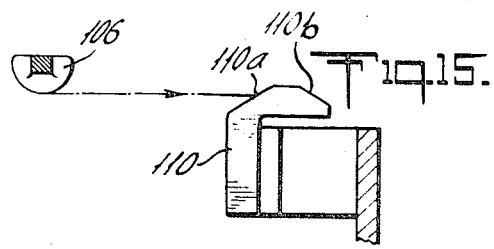

TRAVERSE MECHANISM

This invention relates to traverse mechanisms and, more particularly, to traverse mechanisms suitable for use in machines for winding a continuous strand onto a core. The invention will, in general, be described with reference to the winding of a yarn, as this is the preferred application of the invention; it is to be appreciated, however, that the invention is equally applicable to the winding of other continuous strands.

In machines for winding a continuous strand, such as a yarn, onto a core, a means guiding the strand onto the core is caused to traverse at least part of the length of the core whereby windings of the strand are laid across the aforementioned at least part of the length of the core. The mechanism which effects this traversing action may be referred to as a traverse mechanism.

The traverse mechanism must translate the rotary motion of a shaft driven by a power source, for example, a motor, into linear motion for driving the yarn guide means along a path traversing the core. In the prior art, this translation is accomplished by means of various arrangements of cams and levers connecting the rotationally driven shaft to the yarn guide means. These arrangements necessarily impart a loss of motion between the rotationally driven shaft and the yarn guide means, which results in deviations from the desired uniform motion of the yarn guide means and consequently, undesired irregularities in the package of yarn being formed by the winding operation.

Another problem in the prior art is that the final linkage between the rotationally driven shaft and the yarn guide means may be a vertical pushrod. Therefore, the frame of the machine must be sufficiently elevated above the floor to permit downward movement of the pushrod. The increased height of the machine above the floor can create serious inconveniences. Thus, for example, in the case of a ringtwisting machine for yarn, the creel may be at as such a height that it is difficult for an operator to doff the machine.

Still another disadvantage of the prior art traverse mechanisms is the trouble and expense of modifying the machine for the purpose of changing the shape of the yarn package formed thereby. Specifically, in order for a different yarn package configuration to be formed, it is necessary to remove at least one cam from the machine and replace it with a different cam having a predetermined, precisely machined periphery.

An According to the present invention, there are provided traverse mechanisms which eliminate the above-enumerated enumerated disadvantages.

In particular, according to one aspect of the invention, there is provided a traverse mechanism comprising a lead screw engaging a running nut, means for rotationally driving the screw, means for preventing the nut from reversed with the screw, whereby rotation of the screw drives the nut in a linear path axially along the screw, and means nonpivotally linking the nut to the yarn guide means for causing the yarn guide means to be driven in the path of the desired traverse motion.

According to another aspect of the invention, the traverse mechanism also includes means for alternating the direction in which the screw is driven, whereby the direction of travel of the nut along the screw is reversed each time the direction of rotation of the screw is changed and the yarn guide means reciprocates along the path of traverse.

In a preferred embodiment, the alternating means includes two shafts, means for driving the shafts in opposite rotational directions, clutch means arranged for alternate engagement with the shafts, and means interconnecting the clutch means with the screw for transmitting the respective rotations of the shafts to the screw. In a more particular embodiment of the alternating means, the clutch means includes two electromagnetic clutches and there are provided two switches, each of the switches being connected to the clutches for activation by each of the switches of a respective one of the clutches and simultaneous deactivation thereby of the other of the clutches, and two cams carried by the running nut, the switches and the cams being so arranged that when the nut reaches either predetermined extremity of its reciprocation a respective one of the cams engages a respective one of the switches to activate a respective one of the clutches and simultaneously deactivate the other of the clutches, whereby the direction of rotation of the screw is reversed and therewith the direction of the nut in its linear path along the screw is reversed. Consequently, the direction of movement of the guide means along the path of traverse is reversed.

According to another aspect of the invention, in which it is desired that the machine make a noncylindrical yarn package, the alternating means further includes means for adjusting at least one of the extremities of the reciprocation of the nut during at least part of the winding of the yarn onto the core. In a preferred embodiment, this adjusting means includes the provision of a nonplanar camming surface on the cam which controls the position of the adjustable extremity of the reciprocation and means for imparting incremental rotation to this cam during a cycle of the reciprocation, whereby different portions of the nonplanar camming surface engage and thereby actuate the respective aforementioned switch upon successive strokes in the reciprocation, and the engagement thereby occurs at different positions in the path of reciprocation of the nut. In a specific embodiment, the incremental rotation imparting means comprises a one- way clutch having a rotatable striker member, the striker member of the one-way clutch and the rotatable cam having a common axis of rotation and being interconnected for rotation of the rotatable cam with the striker member and for reciprocation of the striker member, together with the rotatable cam, with the nut, a fixed cam for engagement with the striker member and being so positioned that the path in which the striker member reciprocates intersects with the fixed cam, whereby during the reciprocation, the striker member engages the fixed cam and thereby is rotated through an increment and then becomes disengaged from the fixed cam, and means connected to the striker member for urging the striker member back to its initial position after it has become disengaged from the fixed cam.

The invention will now be further described by detailed reference to specific embodiments thereof, in which it is incorporated into a yarn ringtwister or ringspinner.

IN THE DRAWINGS

FIG. 2 is a side view of the machine;

FIG. 3 is a fragment of FIG. 2, showing the traverse mechanism in a different position;

FIG. 4 is a detail, partly in section, taken along section line 4–4 on FIG. 2;

FIG. 5 is a detail, partly in section, taken along section line 5–5 on FIG. 2;

FIG. 6 is an end elevation view of the machine, partly in section, taken along section line 6–6 on FIG. 2 but with the traverse mechanism in a different position;

FIG. 7 is a detail, partly in section, taken along section line 7–7 on FIG. 5;

FIG. 8 is a detail partly in section, taken along section line 8–8 on FIG. 5;

FIG. 9 is a detail, partly in section, taken along section line 9–9 on FIG. 5;

FIG. 10 is an elevation view of a conventional noncylindrical yarn package;

FIG. 11 is a side elevation of a modification of the traverse mechanism of the machine of FIGS. 1 to 10, which modification causes the machine to form the package of FIG. 10;

FIG. 12 is a detail, partly in section, taken along section line 12–12 on FIG. 6;

Figure 1:
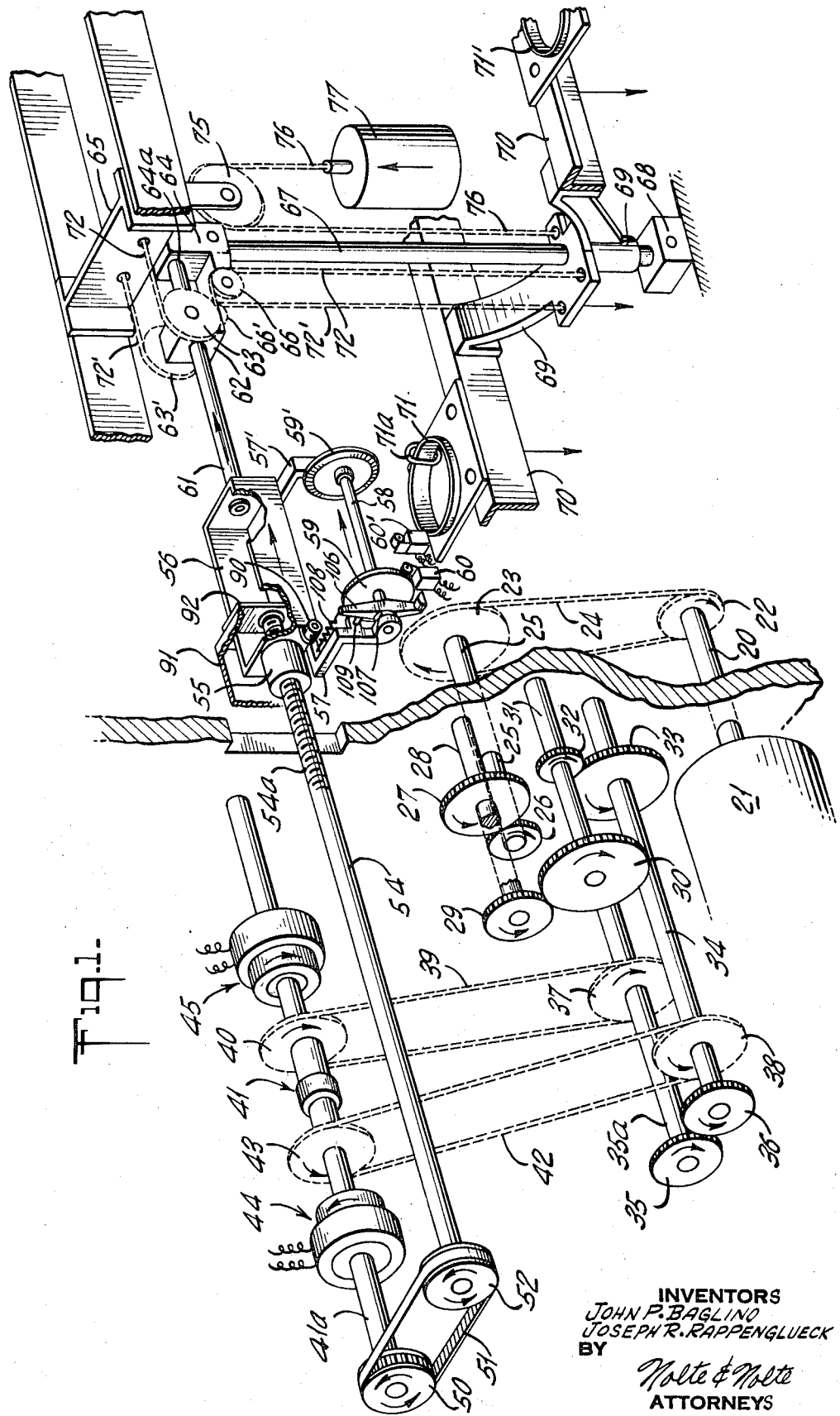
FIG. 1 is a schematic isometric view of a ringtwisting or ringspinning machine incorporating the traverse mechanism of the invention.

FIG. 13 corresponds to FIG. 11, showing the traverse mechanism, however, in a different position;

FIG. 14 is a detail, partly in section, taken along section line 14–14 on FIG. 13;

FIG. 15 is a detail, partly in section, taken along section line 15-15 on FIG. 13.

Referring to FIG. 1, on the drive shaft 20 of the motor 21 is fixed a timing pulley 22. The timing pulley 22 drives a timing pulley 23 by means of a timing belt 24. Accordingly, viewing the machine from the left-hand hand end of FIG. 1, clockwise rotation of the timing pulley 22 causes clockwise rotation of the timing pulley 23. The timing pulley 23 is fixed to the shaft 25 to which is also fixed a gear 26 which, consequently, also is rotating clockwise. The gear 26 meshes with a gear 27 fixed on a shaft 28 on which is also fixed a gear 29; consequently, gears 27 and 29 rotate counterclockwise. The gear 29 meshes with a gear 30 fixed on a shaft 31 on which is also fixed a gear 32. The shaft 31 is, therefore, driven clockwise. The gear 32 meshes with a gear 33 fixed on a shaft 34 and thereby drives the shaft 34 counterclockwise. Fixed on the shaft 35a is also a gear 35 and fixed on the shaft 34 is also a gear 36, gears 35 and 36 meshing. Also fixed on the shaft 35a is a sprocket 37 and on the shaft 34 a sprocket 38.

Sprockets 37 and 38 are rotating with their respective shafts in opposite directions, sprocket 37 rotating clockwise and sprocket 38 rotating counterclockwise. By means of a chain 39, the sprocket 37 drives a sprocket 40 mounted on a clutch shaft 41. By means of a chain 42 the sprocket 38 drives a sprocket 43 also fixed on the clutch shaft 41. Also mounted on the clutch shaft 41 are two electromagnetic clutches 44 and 45. When one of the clutches is activated the other clutch is simultaneously deactivated whereby only one of the clutches is activated at a given time. Thus, when clutch 44 is activated, counterclockwise rotation is imparted to the output end 41a of the clutch shaft 41, and when clutch 45 is activated, clockwise rotation is imparted to the output an end 41a of the clutch shaft 41.

The clutches 44 and 45 are located at the central portion of the clutch shaft 41 between sprockets 40 and 43 whereby sprockets 40 and 43 are not imparting opposing rotational moments to the same structure but rather are rotating in opposite directions different components of the clutches themselves. The particular construction involved therein for providing counterrotation to different components in no way constitutes part of the present invention and has not been shown in detail because it is a common expedient in the design of machinery. It is only important to note that the arrangement of the components of the clutch shaft 41 is such that actuation of the clutch 44 results in transmission of the rotation imparted by sprocket 43 to the output end 41a of the clutch shaft 41, and, likewise, actuation of the clutch 45 results in transmission of the rotation imparted by sprocket 40 to the output end 41a of the clutch shaft 41.

Fixed on the output end 41a of the clutch shaft 41 is a timing pulley 50. The position of the traverse mechanism illustrated in FIG. 1 is such that the clutch 44 is in the actuated state. Accordingly, counterclockwise rotation is imparted to the timing pulley 50. A timing belt 51 transmits this counterclockwise rotation to a timing pulley 52 fixed on the end of a shaft 54 which shaft includes a threaded lead screw portion 54a.

An internally threaded running nut 55 is mounted on the lead screw 54a in engagement with the threads thereof. By the provision of a structure which will be explained hereinafter, the running nut 55 is free to move axially along the lead screw 54a but is restrained against rotation. Assuming conventional threading directions, accordingly, counterclockwise rotation of the lead screw 54a results in movement to the right of running nut 55 and, similarly, clockwise rotation of the lead screw 54a would result in movement to the left of running nut 55.

A casting 56 is fixed on the running nut 55. Fixed on casting 56 are arms 57 and 57' carrying between the ends thereof a shaft 58 which in turn carry like cams 59 and 59'.

Arranged for respective engagement with the cams 59 and 59' are switches 60 and 60'. Appropriate electrical connections, obvious per se, are provided so that the engagement of switch 60 by cam 59 activates clutch 45 and simultaneously deactivates clutch 44 whereas, conversely engagement of switch 60' by cam 59' activates clutch 44 and simultaneously deactivates clutch 45. Once a switch has been put into operation by engagement with a cam, the respective activation and deactivation of clutches remains the same until the other switch is engaged.

In the position of the traverse mechanism illustrated in FIG. 1, switch 60' is in the activated state by virtue of previous engagement by cam 59' and switch 60 is in the process of being engaged and activated by cam 59. In other words, in an instant clutch 44 will be deactivated and clutch 45 will be activated whereby the rotation of the lead screw 54a will be reversed and, consequently, the direction of travel of the running nut 55 will be reversed.

Fixed at the other end of the casting 56 is a shaft 61 on which is fixed a block 62. Rotatably mounted on block 62 are sprockets 63 and 63'. A bracket 64 is mounted on rails 65 of the machine. A bore 64a is provided in the bracket 64 in which bore the shaft 61 is reciprocably guided. A vertical guide rod 67 has one of its ends fixed to the bottom of the bracket 64 and the other of its ends fixed to a bracket 68 mounted on the floor. Reciprocably mounted on the shaft 67 is a bracket 69 having opposed arms carrying respective conventional ring rails 70 and 70'. Mounted on the ring rails 70 and 70' are conventional twisting or spinning rings 71 and 71', each provided with a conventional traveler which is shown on ring 71 as 71a. A chain 72 is fixed at one end to the rails 65, first engages the sprocket 63 and then engages the sprocket 66 and is fixed at its other end to the bracket 69. A like chain 72' is likewise arranged, being fixed at one of its ends to the rails 65, engaging sprocket 63' first and then sprocket 66' and fixed at its other end to the bracket 69. Also rotatably mounted on the bracket 64 is a grooved pulley 75. Here, the block and tackle principal is utilized in reverse, allowing a movement of two increments on the traverse for every increment of travel on the lead screw. A cable 76 passes of the grooved pulley 75 and is connected at one of its ends to the bracket 69 and carries at the other end a counterweight 77.

By virtue of the foregoing arrangement of sprockets and chains, it is apparent that when the lead screw and running nut arrangement drives shaft 61 to the right, the ring rails are lowered and, conversely, when the shaft 61 is driven to the left the ring rails are raised. Counterweight 77 simply assists this reciprocating action.

In a conventional ringtwisting machine or ringspinning machine, the ring rails 70 and 70' extend a considerable distance and each carry numerous rings, for example, 20. This appears partly in FIG. 2. In order to distribute the load of lifting the ring rails and to provide balanced lifting, normally there would be provided a number of the lifting arrangement illustrated in FIG. 1, as partly so shown in FIG. 2. In other words, the shaft 61 extends the length of the machine and the chains and sprockets arrangement illustrated is provided periodically along the length of the shaft 61.

With respect to FIG. 2, this is intended to show the relationship of the traverse mechanism of the invention to a conventional ringtwisting or ringspinning machine. Thus all of the structure illustrated but for the traverse mechanism is conventional and, accordingly, does not require detailed description.

Briefly, a yarn 80 is fed from a package on a creel located above the machine (not illustrated), by means of a conventional nip roll mechanism 81. The yarn passes through a conventional fixed yarn guide 82 and then through the traveler 71a which guides the yarn onto a bobbin 83 mounted on a rotating spindle 84. The spindle 84 is rotationally driven by a transmission belt 85. The traverse mechanism of the invention reciprocates the ring rails and thereby reciprocates the twisting or spinning rings along the height of the bobbin 83 whereby the yarn 80 is wound on the entirety of the bobbin 83.

In FIG. 3, the traverse mechanism is shown at a position a full half-cycle removed from the position illustrated in FIG. 1 whereby at the instant illustrated in FIG. 3 the rings are positioned at the very tops of the bobbins and are about to be reversed whereas at the position of the traverse mechanism illustrated in FIG. 1 the rings would be at the very bottoms of the bobbins and about to be reversed.

By reference to FIGS. 5 to 9, the lead screw and running nut mechanism of the present invention will more fully be understood.

The casting 56 is essentially U-shaped The running nut 55 is provided with an externally threaded collar 55a and the open end of the U of the casting 56 is provided with an internally threaded collar 56a. The external threads of the collar 55a engage the internal threads of the collar 56a whereby the casting 56 is fixedly mounted on the nut 55.

An arm fixed on the casting 56 rotatably carries a roller 90. A three-sided housing 91 is fixedly mounted on the frame of the machine and the lead screw 54a passes therethrough. A T-shaped end plate 92 is mounted on the right-hand end of the housing 91. The arms of the casting 56 pass through the openings defined by the housing 91 and its end plate 92. The end plate 92 is provided with a centrally disposed bore which rotatably supports the free end of the lead screw 54a. One of the walls of the housing is provided with tracks 93 and 93' which engage the roller 90. The engagement of the roller 90 by the tracks 93 and 93' permits the nut 55 to reciprocate in the housing 91 by virtue of rolling of the roller 90 between the tracks 93 and 93' as the nut 55 is driven by rotation of the lead screw 54a. However, on the other hand, the engagement of the roller 90 with the tracks 93 and 93' prevents rotation of the nut, which insures axial driving of the nut 55 by rotation of the lead screw 54a. Since the casting 56 is fixedly connected to the nut 55 and the shaft 61, the casting 56 and the shaft 61 reciprocate with the nut 55.

In connection with FIG. 5, it is noted that a fail-safe brake 100 is mounted for engagement with the clutch shaft 41. This type of electric brake and the circuitry therefore are known per se. This type of brake is released when there is current running through it, and applied braking force only when there is a loss of current. If there is a loss of power in the system, the clutches will open leaving the clutch shaft in a free rotating condition which will not inhibit the lead screw's turning and consequently, will allow the traverse to travel unrestrained to the bottom of its stroke. This difficulty, however, is avoided by the provision of the fail-safe safe brake 100 because when there is a loss of power in the system, the fail-safe safe brake 100 immediately brakes the clutch shaft 41.

The embodiment hereinabove described is for the formation of cylindrical yarn packages. For this purpose the shaft 58 may be fixed and the cams 59 and 59' may be in the form of vertical rods rather than discs or in any other form provided that they are oriented so as to engage the switches 60 and 60', respectively, at the ends of the path or reciprocation. There will now be described with particular reference to FIGS. 10 to 15, an embodiment of the invention for the formation of noncylindrical yarn packages, in which the shaft 58 is provided with means for incremental rotation and at least one of the cams 59 and 59' must be of a configuration to provide, upon incremental rotation, a varying point of engagement with the respective switch.

For many yarn applications, it is desired to provide noncylindrical yarn packages. A common one such package, set forth merely as an example, is a bottle-shaped package (FIG. 10). It will now be explained how the traverse mechanism of the present invention may expeditiously and inexpensively be modified for the formation of such a yarn package or any other noncylindrical yarn package.

In this embodiment, the ends of the shaft 58 are rotatably supported by the arms 57 and 57'. The cam 59 is removed and replaced by a cam 105. The cam 105 may, for example, have a generally circular periphery but is provided with a nonplanar camming surface 105a. The requisite configuration of the camming surface 1 5a depends upon the desired exact configuration of the tapered end of the bottle-shaped package and the predetermined magnitude of the increments of rotation of the shaft 58. These, however, will be obvious, routine design matters in view of the detailed description appearing hereinafter.

A striker arm 106 is mounted on the shaft 58 by means of a conventional one-way clutch 107. A spring connected at one end to the bracket 57 and at the other end to the striker arm 106 urges the striker arm 106 to a rest position in abutment against an axially adjustable stop screw 109.

A cam 110 is mounted on the frame of the machine at a position predetermined so that when the nut 55 is at the center of its path of reciprocation, the free end of the striker arm 106 will engage the cam 110 and be urged thereby through an increment of rotation (FIG. 6). As the nut 55 reaches the right-hand extremity of reciprocation, the cam 59 engages the switch 60 to reverse the direction of travel of the nut 55. Thus, engagement of the striker arm 106 with the cam 110 at the center of reciprocation and engagement of the cam 59 at the left-hand extremity of reciprocation with the switch 60 cause, on the one hand, rotation of the striker arm and with it the shaft 61 and the cam 105 through an increment of rotation and, on the other hand, reversal of the direction of travel of the nut 55. A spring 108 draws the striker arm 106 back to its rest position after it has become disengaged from the cam 110, but the provision of the one-way clutch 107 results in the increment of rotation which was imparted to the shaft 58 and the cams 59 and 105 mounted thereon not being reversed by the return of the rocker arm 106 to its rest position. In this embodiment, of course, the cam 59 should be disc shaped rather than alternatively rod shaped since the shaft 58 is rotated. On the reverse half-cycle cycle of reciprocation of the nut 55, at the midpoint, the striker arm again engages the cam 110 and is rotated thereby through another increment of rotation. As heretofore described with reference to the other half-cycle of reciprocation, the increment of rotation is irreversibly transmitted to the cam 105. Finally, as the nut 55 reaches the left-hand extremity of its reciprocation, the camming surface 105a of the cam 105 engages the switch 60' to reverse the direction of travel of the nut 55. That there are literally two increments of rotation of the cam 105 per cycle of reciprocation is only incidental to the particular construction illustrated. All that is required is a single increment of rotation and, accordingly, the two increments of rotation may be thought of as a single collective increment in order to understand the general character of this aspect of the invention. Moreover, the cam 110 and striker arm 106 do not have to be arranged to provide engagement at the literal midpoint or center of the path of reciprocation but may be arranged to provide engagement at any point intermediate the extremities of reciprocation.

The particular camming action between the free end of the rocker arm 106 and the cam 110 provided in the particular embodiment illustrated is shown in detail in FIGS. 6, 12 and 15. With reference to these figures, it is particularly clearly seen that the cam 110 is provided with a camming surfaces 110a and 110b each in the form of an inclined plane. As the nut 55 travels to the right, the free end of the striker arm 106 is carried in a linear path toward the camming surface 110a. As the nut 55 passes through its center of travel, the free end of the striker arm 106 engages and rides up the inclined plane of the camming surface 110a (FIGS. 6 and 12), and thereby the striker arm 106 is incrementally rotated. As the nut 55 continues toward the right hand extremity of travel, the striker arm 106 returns to its rest position. In FIG. 12, the free end of the striker arm 106 has completed its travel along the camming surface 110a from the point of initial engagement indicated by the line of projection in FIG. 15. Similarly, on the reverse stroke, as the nut 55 passes through its center of travel, the free end of the striker arm 106 engages and rides up the inclined plane of the camming surface 110b, whereby the striker arm is incrementally rotated, and then, as the nut 55 continues toward the left hand extremity of travel, the striker arm 106 returns to its rest position.

It is to be noted that in FIG. 1 the striker arm 106 and one-way clutch 107 are illustrated, in order that their relationship to the entire mechanism may be better understood, though in the embodiment illustrated, in order that their relation in this figure the striker arm and one-way clutch combination is not actuated.

From the foregoing description, it should be appreciated that for each cycle of reciprocation there is effected incremental rotation of the cam 105, whereby in each cycle, at the right-hand end of the stroke (as illustrated in FIG. 13), the switch 60' is engaged by a different portion of the camming surface 105a and thereby reversal of the direction of travel occurs at varying axial displacements of the nut 55 relative to the lead screw 54a. By provision of a readily mathematically calculated nonplanar camming surface 105a, these variations in the right-hand extremity of the reversal are readily made to occur in a sequence which causes the yarn package being formed to have the tapered end configuration illustrated in FIG. 10. Like provision can be made with respect to substituting the other cam 59 so that at both ends the yarn package may have a noncylindrical configuration. It is thus seen that by variations of cams 59 and 59' any desired noncylindrical yarn package may be obtained. It is particularly important to note that in the prior art, cams to change yarn package shaped generally involved a highly precisely machined cam periphery. In the present invention, however, a camming surface rather than a camming periphery is involved, and, accordingly, fabrication of the necessary cams is much simpler and less expensive. Thus, the cam 105 may readily be made from sheet metal the surface of which will be the camming surface 105a. Also, it is obvious that replacement of cams is very simple whereas in the prior art cam changes generally involved careful adjustment of many engaging parts.

While the invention has been described by reference to particular embodiments, it is to be understood that the scope of the invention, as defined by the appended claims, is intended to encompass not only the above description but also all obvious modifications and variations thereof.

We claim:

1. In a machine which winds a continuous strand onto a core in which a means guiding the strand onto the core is caused to traverse at least part of the length of the core whereby windings of the strand are laid across at least part of the length of the core, a traverse mechanism for effecting said traversing comprising a lead screw engaging a running nut, means for rotationally driving said screw, means for preventing said nut from rotating with said screw, whereby rotation of said screw drives said nut in a linear path axially along the screw, means nonpivotally linking said nut to a said guide means for causing said guide means to be driven in the path of said traversing by the motion of said nut, means for alternating the direction in which said screw is driven, whereby the direction of travel of the nut along the screw is reversed each time the direction of rotation of the screw is changed and the guide means reciprocates along said path of traverse, said alternating means including two shafts, means for driving said shafts in opposite rotational directions, clutch means arranged for alternate engagement with said shafts, and means interconnecting said clutch means with said screw for transmitting the respective rotations of said shafts to said screw, said clutch means comprising two electromagnet clutches and further comprising two switches, each of said switches being connected to said clutches for activation by each of said switches of a respective one of said clutches and simultaneous deactivation thereby of the other of said clutches, and two cams carried by said nut, said switches and said cams being so arranged that when said nut reaches either predetermined extremity of its reciprocation a respective one of the cams engages a respective one of the switches to activate a respective one of the clutches and simultaneously deactivate the other of said clutches, whereby the direction of rotation of said screw is reversed and therewith the direction of said nut in its linear path along the screw is reversed and, consequently, the direction of movement of said guide means along said path of traverse is reversed.

2. In a machine according to claim 1, in which said alternating means further comprises means for adjusting at least one of the extremities of the reciprocation of said nut during at least part of the winding on said core.

3. In a machine according to claim 2, in which said adjusting means comprises a nonplanar camming surface on the cam which controls the position of said adjustable extremity and means for imparting incremental rotation to said cam during a cycle of said reciprocation, whereby different portions of said nonplanar camming surface engage and thereby actuate said switch upon successive strokes in said reciprocation and said engagement thereby occurs at different positions in the path of reciprocation of said screw.

4. In a machine according to claim 3, in which said incremental rotation imparting means comprises a one-way clutch having a rotatable striker member, the striker member of said one-way clutch and said rotatable cam having a common axis of rotation and being interconnected for rotation of said rotatable cam with said striker member and for reciprocation of said striker member, together with said rotatable cam, with said nut, a fixed cam for engagement with said striker member and being so positioned that the path in which said striker member reciprocates intersects with said fixed cam, whereby during said reciprocation said striker member engages said fixed cam and thereby is rotated through an increment and then becomes disengaged from said fixed cam, and means connected to said striker member for urging said striker member back to its initial position after it has become disengaged from said fixed cam.

5. A device for adjusting the position of an extremity of the path of reciprocation of a reciprocally driven member, comprising a rotatable cam having a nonplanar camming surface and being mounted on said reciprocally driven member, means for reversing the direction of travel of said reciprocally driven member, said reversing means being positioned in the path of reciprocation of said rotatable cam for engagement with and consequent actuation by said camming surface and means for rotating said rotatable cam incrementally during a cycle of said reciprocation, whereby different portions of said nonplanar camming surface engage and thereby actuate said reversing means upon successive strokes in said reciprocation and said engagement thereby occurs at different positions in the path of reciprocation of said reciprocally driven member, said incremental rotation imparting means comprises a one-way clutch having a rotatable striker member, the striker member of said one-way clutch and said rotatable cam having a common axis of rotation and being interconnected for rotation of said rotatable cam with said striker member and for reciprocation of said striker member, together with said rotatable cam, with said reciprocally driven member, a fixed cam for engagement with said striker member and being so positioned that the path in which said striker member reciprocates intersects with said fixed cam, whereby during said reciprocation said striker member engages said fixed cam and thereby is rotated through an increment and then becomes disengaged from said fixed cam, and means connected to said striker member for urging said striker member back to its initial position after it has become disengaged from said fixed cam.